(12) United States Patent
Richter et al.

(10) Patent No.: US 10,352,432 B2
(45) Date of Patent: Jul. 16, 2019

(54) GEAR HOUSING ESPECIALLY FOR AN EPICYCLIC GEAR SET AND METHOD OF MAKING SAME

(71) Applicant: BÜHLER MOTOR GMBH, Nüremberg (DE)

(72) Inventors: Olaf Richter, Stein (DE); Daniel Kirchgessner, Rimpar (DE); Reiner Hettych, Nürnberg (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 0 days.

(21) Appl. No.: 15/897,456

(22) Filed: Feb. 15, 2018

(65) Prior Publication Data

US 2018/0238432 A1    Aug. 23, 2018

(30) Foreign Application Priority Data

Feb. 21, 2017    (DE) .......................... 10 2017 103 502

(51) Int. Cl.
*F16H 57/031*    (2012.01)
*B29C 65/06*    (2006.01)
(Continued)

(52) U.S. Cl.
CPC ........... *F16H 57/031* (2013.01); *B23K 20/12* (2013.01); *B29C 65/0672* (2013.01); *B29C 65/08* (2013.01); *B29C 65/1412* (2013.01); *B29C 65/7814* (2013.01); *B29C 66/1142* (2013.01); *B29C 66/1162* (2013.01); *B29C 66/1282* (2013.01); *B29C 66/12841* (2013.01);
(Continued)

(58) Field of Classification Search
CPC ........ F16H 1/28; F16H 2001/327; F16H 3/54; F16H 2057/02017; F16H 2057/02026; F16H 2200/2097; F16H 2700/00; F16H 57/02; F16H 57/023; F16H 57/031; F16H 57/0479; F16H 57/08; F16H 57/082; B23K 2201/008
See application file for complete search history.

(56) References Cited

U.S. PATENT DOCUMENTS 5,662,545 A * 9/1997 Zimmerman ......... B05B 3/0422
29/893.1
2010/0304918 A1* 12/2010 Burgman ............. F16H 57/082
475/331
(Continued)

FOREIGN PATENT DOCUMENTS

EP    2644309 B1    4/2015

*Primary Examiner* — Prasad V Gokhale
(74) *Attorney, Agent, or Firm* — Westerman, Hattori, Daniels & Adrian, LLP

(57) ABSTRACT

A gear housing for an epicyclic gear set, the gear housing including a hollow wheel having internal teething and a first front end with a first front-side joining surface; a housing cover having a second front end with a second front-side joining surface for longitudinally axially covering the hollow wheel; and a bonded connection for connecting the first front end to the second front end through the mating of the first and second front-side joining surfaces, at which the hollow wheel and the housing cover are connected to each other by a bonded connection, in particular, by heated tool welding, infrared welding, ultrasonic welding, or rotary friction welding.

16 Claims, 3 Drawing Sheets

(51) Int. Cl.
  *B29C 65/08* (2006.01)
  *B29C 65/14* (2006.01)
  *B29C 65/78* (2006.01)
  *B29C 65/00* (2006.01)
  *F16H 57/08* (2006.01)
  *F16H 57/023* (2012.01)
  *F16H 57/032* (2012.01)
  *B23K 20/12* (2006.01)
  *F16H 1/32* (2006.01)
  *B29L 31/00* (2006.01)
  *B29L 15/00* (2006.01)
  *B29C 65/20* (2006.01)
  *F16H 1/28* (2006.01)
  *F16H 57/02* (2012.01)

(52) U.S. Cl.
  CPC ........ *B29C 66/322* (2013.01); *B29C 66/3494* (2013.01); *B29C 66/5344* (2013.01); *B29C 66/612* (2013.01); *B29C 66/73921* (2013.01); *B29C 66/8242* (2013.01); *B29C 66/8246* (2013.01); *B29C 66/91933* (2013.01); *B29C 66/9241* (2013.01); *B29C 66/9292* (2013.01); *F16H 57/023* (2013.01); *F16H 57/032* (2013.01); *F16H 57/08* (2013.01); *B29C 65/20* (2013.01); *B29C 66/542* (2013.01); *B29C 66/8322* (2013.01); *B29L 2015/003* (2013.01); *B29L 2031/748* (2013.01); *B29L 2031/749* (2013.01); *F16H 1/28* (2013.01); *F16H 2001/327* (2013.01); *F16H 2057/02017* (2013.01)

(56) References Cited

U.S. PATENT DOCUMENTS

| | | | |
|---|---|---|---|
| 2012/0094798 A1* | 4/2012 | Uchida | B23K 26/28 475/220 |
| 2013/0255438 A1* | 10/2013 | Kieninger | B23K 33/006 74/606 R |
| 2015/0258642 A1* | 9/2015 | Killian | B23P 15/14 29/893.3 |
| 2016/0377163 A1* | 12/2016 | Ziskovsky | F16H 57/02 475/331 |

* cited by examiner

GEAR HOUSING ESPECIALLY FOR AN EPICYCLIC GEAR SET AND METHOD OF MAKING SAME

BACKGROUND OF THE INVENTION

1. Field of the Invention

The invention relates to a gear housing in general and to a gear housing for an epicyclic gear set, in particular. The gear housing has a hollow wheel and a housing cover for longitudinally axially covering the hollow wheel. The invention further relates to a method for producing such a gear housing.

2. Background of the Invention

From EP 2 644 309 B1 is known a gear housing having a hollow wheel and a housing cover. The hollow wheel has internal teething in sections and is covered longitudinally axially by the housing cover. Between the housing cover and the hollow wheel, an overlap region is formed, in which the hollow wheel and the housing cover mesh coaxially. The hollow wheel features a material transparent to laser light so that the housing cover can be connected to the hollow wheel by means of laser transmission welding.

The known connection between the hollow wheel and the housing cover necessarily requires the use of a material transparent to laser light for the hollow wheel. It is, at the same time, required that the housing cover feature a laser light-absorbing material. The two materials that can be influenced by laser light in different ways must be adapted to each other such that they can be welded together. The two materials must, in particular, have differing laser light properties, but similar melting temperatures, in order to allow welding.

This significantly limits the selection of material for the components of the gear housing. It is, moreover, required that the housing cover and the hollow wheel be connected by a press fit prior to the welding process, so that sufficient contact exists between the joining surfaces. Such a press fitting process is difficult to realize, especially, in components produced by injection molding, and thus increases production costs. The production costs are also negatively influenced by the requirement of a laser light system, which creates high investment costs, for laser transmission welding. Additional effort of a technical nature arises in laser transmission welding when round gear housings must be welded, because the joining partners must rotate in the process.

BRIEF SUMMARY OF THE INVENTION

The aim of the invention consequently consists in specifying a gear housing that can be produced easily, cost-effectively, and reliably. It is a particular aim of the invention to show a production method for a gear housing, which method reduces production costs and technical production effort.

The invention is thus based upon the idea of specifying a gear housing, in particular, for an epicyclic gear set, with a hollow wheel, which has internal teething, at least in sections, and with a housing cover for longitudinally axially covering the hollow wheel, wherein the hollow wheel and the housing cover can be connected on the front side and respectively have front-side joining surfaces, at which the hollow wheel and the housing cover can be connected to each other by a bonded connection. The bonded connection can, in particular, be carried out by heated tool welding or infrared welding or ultrasonic welding or rotary friction welding.

The invention is distinguished from the prior art in that the connection between the hollow wheel and the housing cover takes place, according to the invention, on the front side of each component. This has the advantage that other welding processes that allow for connecting the most diverse materials to each other by a bonded connection can be drawn upon during production. The range of materials available for components of the gear housing is thus, in particular, significantly increased. A limitation with respect to laser transparency is therefore no longer required. The system components required for producing the bonded connection are, moreover, associated with low investment costs when compared to laser devices. At the same time, the front-side connection allows for higher tolerances during the production of the individual connection partners, so that the production costs for the gear housing are, on the whole, reduced.

It is preferably provided in the invention that a recess that is open on the front side and extends along an outer circumference respectively adjoin the joining surfaces of the hollow wheel and the housing cover. Together, the recesses form an annular groove, which accommodates a welding bead. This has the advantage that the welding bead does not protrude over the outer diameter of the gear housing. This simplifies production and, further, ensures that the outer dimensions of the gear housing have a high tolerance accuracy.

A method according to the invention for producing a gear housing, in particular, the previously described gear housing, provides that the following method steps be performed one after the other:

a) Providing a hollow wheel with internal teething, at least in sections, and a housing cover, wherein the hollow wheel and the housing cover respectively have at least one front-side joining surface;

b) Heating the joining surfaces by a heated tool or an infrared radiator so that the hollow wheel and the housing cover are melted, in sections, on the front side; and c) Coaxially joining the hollow wheel to the housing cover in order to form a bondedconnection between the joining surfaces.

In contrast to the prior art, the separate substeps of contacting the joining partners, in particular, the hollow wheel and the housing cover and connecting the joining partners by a bonded connection, are combined into a single work step in the production method according to the invention.

In the invention, the joining surfaces are first heated, so that they are appropriately prepared for the bonded connection. Afterwards, contacting the joining partners and connecting the joining partners by a bonded connection take place simultaneously, by bringing the heated and melted joining surfaces into contact with each other. This has several advantages. On the one hand, for melting the joining surfaces, an appropriate heat source can be used for several joining partners simultaneously. Several hollow wheels and several housing covers can, in particular, be simultaneously heated at their joining surfaces, so that their joining surfaces melt.

The coaxial joining of the melted joining surfaces moreover forgives manufacturing-related tolerance deviations, so that the original components, i.e., the hollow wheel and the housing cover, can be produced with higher manufacturing tolerances. This reduces the effort in the production of the individual joining partners, which is noticeable by a reduction in production costs.

The heating of the joining surfaces is preferably carried out by a heated tool or an infrared radiator. When using a heated tool, it may, in particular, be provided that the heated tool come into contact with the joining surface. This has the advantages that the melting can take place under the influence of a certain mechanical pressure, so that the melting of the joining surfaces is carried out uniformly and quickly. The use of an infrared radiator, on the other hand, allows for contactless heating of the joining surfaces. This avoids the melted material adhering to the heated tool.

In a preferred embodiment of the method according to the invention, the joining surfaces of the hollow wheel and the housing cover are pressed onto each other by pressure during the coaxial joining until the joining surfaces are cooled and firmly connected by a bonded connection. In other words, the joining surfaces are pressed onto each other preferably only until the bonded connection is firm enough that the joining partners maintain their alignment in relation to each other, even after the pressure is released.

In a preferred embodiment, the joining surfaces can be heated to above the respective melting point of a synthetic material used for forming the hollow wheel and/or the housing cover. It is specifically provided that, depending upon the synthetic material used for the hollow wheel and/or the housing cover, the temperature partners may be appropriately adjusted for heating the joining surfaces. It is, in any case, expedient to introduce enough thermal energy into the joining surfaces that they melt.

The joining surfaces can, in particular, be heated for a predetermined duration, wherein the duration is preselected according to the type and efficiency of a radiation element used to heat the joining surfaces. The radiation element, e.g., a heated tool or an infrared radiator, acts on the joining surfaces for a predetermined duration. On the one hand, the duration depends upon the type of radiation element (heated tool or infrared radiator). On the other hand, the preselected duration of the heating of the joining surfaces depends upon the amount of thermal energy that is applied by the radiation element. Lastly, the duration of the heating depends upon the synthetic material used of the respectively melted material.

Another preferred embodiment of the production method according to the invention provides that a joining device be provided for coaxially joining the hollow wheel and the housing cover. The hollow wheel and the housing cover can, in particular, be inserted into a joining device, and a joining force can be applied to them by two pneumatic cylinders and/or a servomotor axis. The joining force is preferably preset as a function of the size of the joining surfaces. The use of a joining device that applies a joining force to the hollow wheel and the housing cover ensures that the joining partners, that is, the hollow wheel and the housing cover, are basically joined to each other by the same force. This increases the reliability of the production method. This, in particular, ensures that a stable and substantially uniform connection of the joining partners is achieved, with constant quality across an entire production batch.

The method according to the invention preferably provides that, after joining, the hollow wheel and the housing cover be cooled for a predetermined duration while maintaining a joining force. The predetermined duration may depend upon the material used and on the size of the gear housing.

For the previously described gear housing and the previously described production method, in preferred embodiments, the front-side joining surfaces being aligned orthogonally to an axis of rotation of the hollow wheel applies. In other words, the hollow wheel and the housing cover are preferably joined with a butt joint or are butt-welded.

Another aspect of the invention relates to a gear housing, in particular, for an epicyclic gear set with a hollow wheel that has internal teething, at least in sections, and with a housing cover for longitudinally axially covering the hollow wheel. The hollow wheel and the housing cover mesh coaxially so that an annular overlap region is formed. In the overlap region, the joining surfaces of the hollow wheel and the housing cover touch each other. The invention provides that the hollow wheel and the housing cover respectively have conical joining surfaces in the overlap region and, along the joining surfaces, are connected to each other by a bonded connection, in particular, by rotary friction welding.

The use of conical joining surfaces allows for easily bringing about a press fit between the joining partners. This ensures that the joining surfaces are connected firmly enough to each other in the overlap region, so that a bonded connection, in particular, by means of rotary friction welding, can be quickly and efficiently established. The conical joining surfaces also allow for an easy alignment of the components in relation to each other during production. This accelerates the production process and, on the whole, reduces production costs.

A method according to the invention, particularly for such a gear housing, comprises the following steps, which chronologically follow one after the other:
 a) Providing a hollow wheel with internal teething, at least in sections, and a housing cover, wherein the hollow wheel and the housing cover have conical joining surfaces that are complementary to each other;
 b) Coaxially joining the hollow wheel to the housing cover in order to establish a surface contact between the conical joining surfaces, wherein an overlap region is formed;
 c) Heating the overlap region, in particular, by rotary friction welding—so that the hollow wheel and the housing cover are connected by a bonded connection in the overlap region.

The conical joining surfaces that are complementary to each other allow for the joining surfaces to be connected to each other easily and with little positioning effort. This provides for a good contact between the joining surfaces, whereby thermal energy can spread into both of the joining partners. This facilitates the welding of the joining partners.

The complementary conical joining surfaces substantially form a self-centering arrangement, so that complex prior positioning can be dispensed with. Moreover, the conical joining surfaces provide a tolerance compensation, so that the production of the joining partners, in particular, of the hollow wheel and of the housing cover, is possible with relatively high manufacturing tolerances. Overall, the production process is, in this way, not only accelerated, but can, at the same time, also be executed cost-effectively.

In the method according to the invention, a preferred variant provides that a press-fit connection between the joining surfaces of the hollow wheel and the housing cover be formed when the front surface contact is established. In other words, the hollow wheel and the housing cover are joined by a joining force, so that a press-fit connection is established. This improves the subsequent welding process.

For all variants mentioned of the gear housing or production method according to the invention, a preferred embodiment provides that the housing cover be formed by a bearing shield of a motor or by an adapter element that is provided for connection of the gear housing to a motor. In this way, the gear housing can be connected directly to a motor, whereby, overall, a compact design and a simple process management is achieved in the production.

With respect to the adapter element, it may preferably be provided that it be connected, or able to be connected, on the gear side by welding to the hollow wheel. On the motor side, the adapter element can have a universal connector for connecting to various motors—in particular, electric motors. The adapter element thus forms a universal interface to various motors. In this way, the gear housing can be connected to various motors by means of the adapter element so that a standardization of individual components can positively affect the production costs. The gear housing can, in particular, in this way be used for various production series of motor gear combinations. In other words, the gear housing can be used across a production series employing a modular design principle.

It applies, in general, that the connection, in particular, the bonded connection, between the hollow wheel and the housing cover must not be carried out exclusively on the front side. The invention also includes embodiments in which, in addition to the bonded connection on the front side, at least surface sections of the hollow wheel and of the housing cover that extend in the circumferential direction overlap, in particular, the housing cover at least partly meshes with the hollow wheel. The overlapping surface sections form an overlap region. In the overlap region, another bonded connection may be provided. The above-described embodiments of the invention may be combined with each other in this respect.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
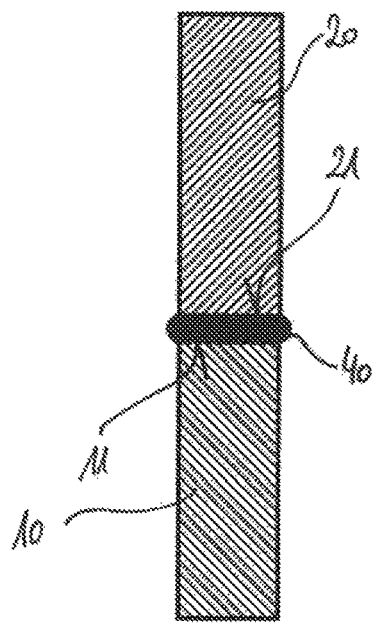
FIG. 1 is a sectional view through a connection region of a gear housing according to the invention in accordance with a preferred exemplary embodiment, wherein the hollow wheel and the housing cover are connected to each other on the front side.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 2:
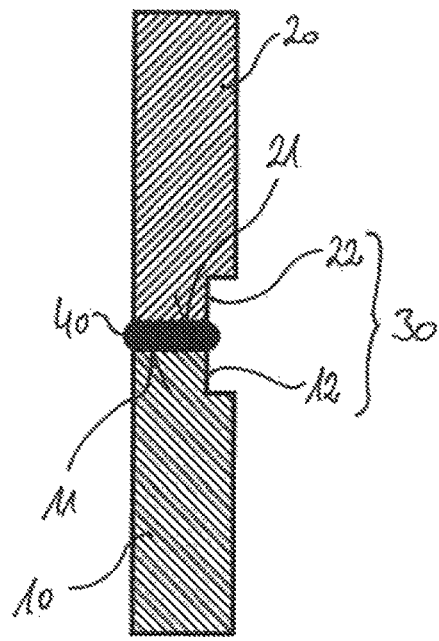
FIG. 2 is a sectional view through a connection region of a gear housing according to the invention in accordance with a preferred exemplary embodiment, wherein the hollow wheel and the housing cover are connected to each other on the front side.
Figure 3:
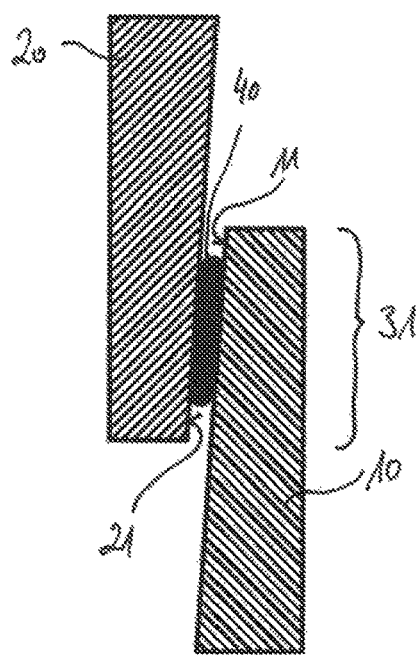
FIG. 3 is a sectional view through an overlap region of a gear housing according to the invention in accordance with a preferred exemplary embodiment, wherein the hollow wheel and the housing cover have conical joining surfaces that are complementary to each other near their front sides.

FIGS. 1 through 3 schematically show various possibilities for the bonded connection between a hollow wheel 10 and a housing cover 20 of a gear housing 1. In the exemplary embodiments according to FIGS. 1 and 2, the hollow wheel 10 and the housing cover 20 are butt-joined to each other. For this purpose, the hollow wheel 10 and the housing cover 20 respectively have front-side joining surfaces 11, 21, which bluntly lie on top of each other and are connected to each other by a bonded connection by means of a welding bead 40. In order to avoid having the welding bead 40 extend over the outer circumference of the hollow wheel 10, and thus affect the outer dimensions of the gear housing 1, it may be preferably provided that the hollow wheel 10 and the housing cover 20 respectively have a recess 12, 22. The adjoining recesses 12, 22 directly adjoin the joining surfaces 11, 21 and extend to the outer circumference of the hollow wheel 10 and of the housing cover 20 respectively. The recesses 12, 22 are preferably designed to be complementary to each other, so that an annular groove 30 shows in the connected state of the hollow wheel 10 to the housing cover 20. The annular groove 30 preferably extends circumferentially around an outer circumference of the hollow wheel 10 or of the housing cover 20. This variant of a joint with an annular groove 30 is shown by way of example in FIG. 2.

The bonded connection between the hollow wheel 10 and the housing cover 20 is preferably carried out by a welding process. For this purpose, it is, in particular, provided that the hollow wheel 10 and the housing cover 20 be respectively formed from a synthetic material. By heating the synthetic material, a bonded connection is established. In doing so, it may, on the one hand, be provided that a heated tool welding process or an infrared welding process be used for the bonded connection. In these two cases, the joining surfaces 11, 21 are initially heated until the melting temperature of the synthetic material of the hollow wheel 10 or of the housing cover 20 is reached or exceeded. As a result, the material in the region of the joining surfaces 11, 21 melts. The melted joining surfaces are subsequently joined to each other coaxially, so that the melted joining surfaces connect to each other by a bonded connection.

It may alternatively be provided that the joining surfaces 11, 21 be connected to each other, in particular, be pressed onto each other by a joining force, prior to the heating. Subsequently, a heating of the joining surfaces 11, 21 pressed onto each other can take place by means of rotary friction welding, for example. A welded connection is also established thereby. The rotary friction welding has the advantage that, as a result of the direct contact with the heated tool rotating about the weld joint, a bulging of a welding bead 40 is avoided. In this respect, an annular groove 30, as shown in FIG. 2, can be dispensed with.

It is, furthermore, possible to connect the hollow wheel 10 to the housing cover 20 by ultrasonic welding. To this end, it is, in particular, provided that at least one joining surface 11 or 21 have an energy director. The energy director may, for example, be an edge along the joining surface geometry. The energy director serves to bundle the ultrasound introduced into the material so that energy is introduced into the region of the joining surfaces in a targeted manner. In ultrasonic welding, the sonotrode generating the ultrasound is preferably placed on the housing cover on the front side. In doing so, the ultrasound penetrates the housing cover, and thus arrives at the joining surfaces 11, 21 between the housing cover 20 and the hollow wheel 10.

FIG. 3 schematically shows an overlap region 31 between the hollow wheel 10 and the housing cover 20. The hollow wheel 10 and the housing cover 20 in this case have joining surfaces 11, 21, which are respectively designed to be conical and which are respectively complementary to each other. The conical shapes of the joining surfaces 11, 21 are complementary to each other, so that the joining surfaces 11, 21 can slide into each other. In this way, the hollow wheel 10 and the housing cover 20 can be positioned easily in relation to each other. By axially applying a joining force, it is, moreover, achieved that the joining surfaces 11, 21 touch each other under pressure, i.e., a press-fit connection is established. The press-fit connection is advantageous for subsequently producing a welding bead 40 by means of rotary friction welding, i.e., for melting the press-fit joining surfaces 11, 21 and connecting them to each other by a bonded connection.

FIGS. 4 through 7 respectively show a combination of a gear housing 1 and a motor 5, which is connected to the gear housing 1 by means of a motor adapter 2. The motor adapter 2 is formed by the housing cover 20, which is connected to the hollow wheel 10 of the gear housing 1 by welding. The motor 5 is designed as an electric motor and has appropriate electrical contacts 51 on an end opposite the gear housing 1. As can be seen in the sectional views according to FIGS. 5 and 7, the motor 5 is equipped with a motor shaft 52, which protrudes into the motor adapter 2. The motor shaft 52 can be connectable or connected to a gear shaft.

The motor adapter 2 is formed by the housing cover 20 and has a motor-side end, on which the motor adapter 2 is designed such that it can be connected to various motors 5. Two or more different motor sizes can, in particular, be connected to the motor adapter. The motor adapter 2 thus forms a platform for a modular system, wherein several motors 5, varying in power, can be connected to the gear housing 1.

In all embodiments according to FIGS. 4 through 7, the hollow wheel 10 respectively has internal teething 13. The internal teething 13 extends over the entire length of a distal section of the hollow wheel 10, wherein the hollow wheel 10 has an increased wall thickness in the distal section. The distal section is adjoined proximally by an overlap region 31, in which the hollow wheel 10 has a reduced wall thickness. The outer diameter of the hollow wheel 10 is identical in the distal section and in the proximal section (overlap region 31).

The motor adapter 2 or the housing cover 20 also has a proximal section and a distal section. In the proximal section, the motor adapter 2 has an outer diameter that corresponds to the outer diameter of the hollow wheel 10. In the distal section, which corresponds to the overlap region 31, the motor adapter has an outer diameter that substantially corresponds to the inner diameter of the hollow wheel 10 in the proximal section. In this respect, cylindrical joining surfaces 11, 21 are formed between the motor adapter 2 or housing cover 20, and the hollow wheel 10. The motor adapter 2 or housing cover 20 is inserted into the hollow wheel 10 so that the joining surfaces 11, 21 overlap and form the overlap region 31.

As a result of the overlap region, it is possible to connect the hollow wheel 10 and the motor adapter 2 or housing cover 20 to each other by a bonded connection, by means of rotary friction welding. For this purpose, it is specifically provided that a rotary friction welding device be guided around the outer circumference of the overlap region 31, whereby the material of the joining surfaces 11, 21 is heated. The heating is carried out to above the melting point of the materials used for the hollow wheel 10 or the housing cover 20, so that a bonded connection between the hollow wheel 10 and the housing cover 20 is established in the region of the heat input.

Figure 4:
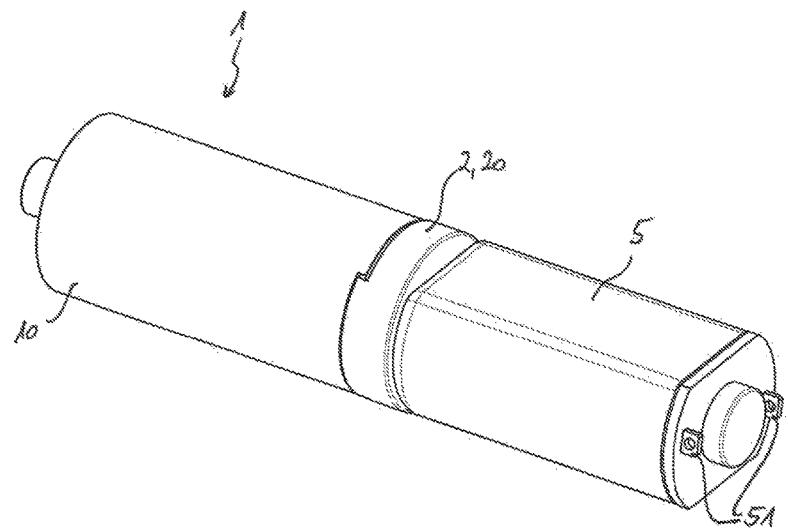
FIG. 4 is a perspective view of a motor/gear housing combination in accordance with a preferred exemplary embodiment, wherein the hollow wheel and the housing cover have joining surfaces that lie on top of each other bluntly.
Figure 5:
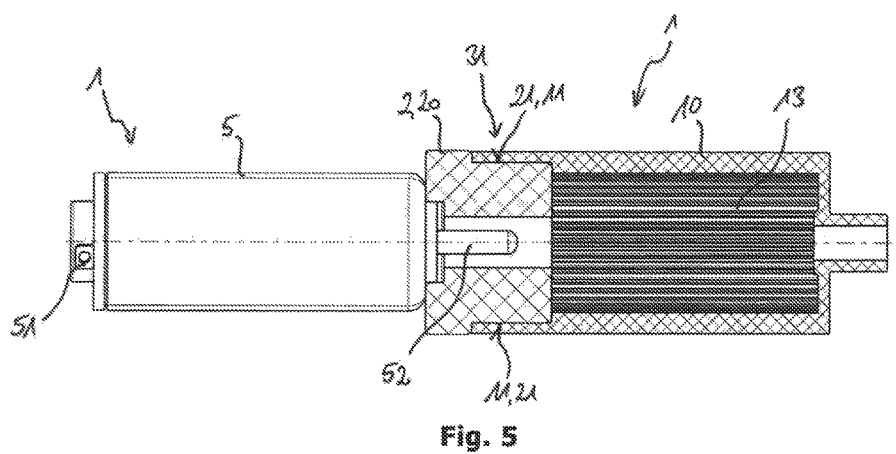
FIG. 5 is a sectional view through the motor/gear housing combination according to FIG. 4.
Figure 6:
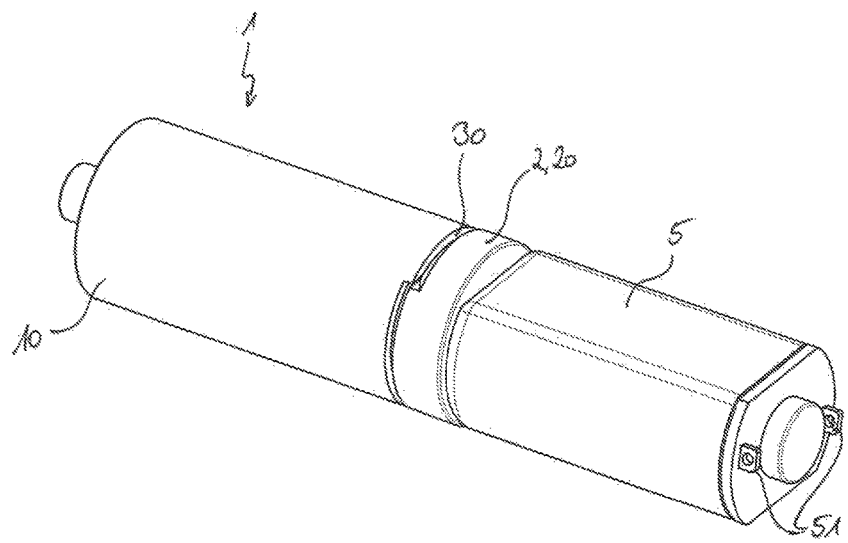
FIG. 6 is a perspective view of a motor/gear housing combination according to a preferred exemplary embodiment, wherein an annular groove for accommodating a welding bead is formed between the hollow wheel and the housing cover.
Figure 7:
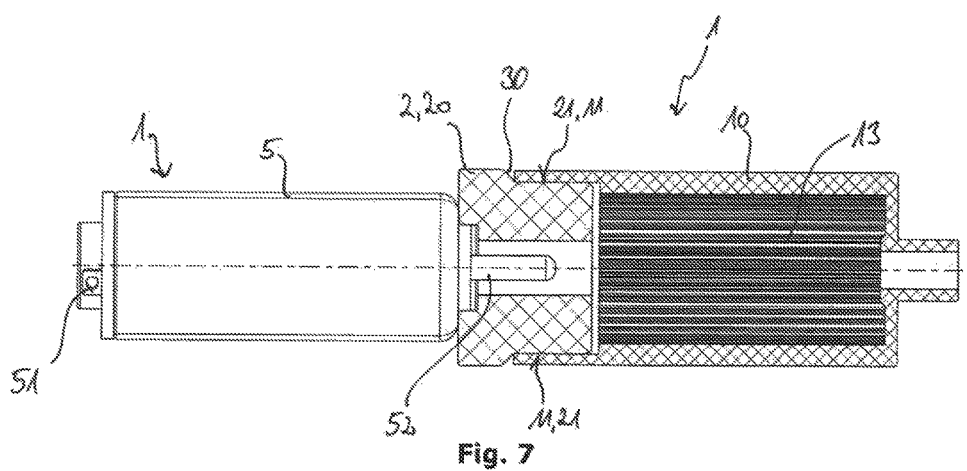
FIG. 7 is a cross-sectional view through the motor/gear housing combination according to FIG. 6.

The exemplary embodiment according to FIGS. 6 and 7 differs from the exemplary embodiment according to FIGS. 4 and 5 in that the proximal section of the motor adapter 2 in the exemplary embodiment according to FIGS. 4 and 5 is connected to the distal section of the motor adapter 2 by an annular surface that extends orthogonally to the longitudinal axis of the hollow wheel.

In the exemplary embodiment according to FIGS. 6 and 7, on the other hand, an oblique annular surface is provided that is substantially aligned conically in relation to the longitudinal axis of the hollow wheel 10. As a result, an annular groove 30 is formed between the proximal section of the motor adapter 2 and the proximal section of the hollow wheel 10 or of the overlap region 31. The annular groove 30 substantially has a cross-sectional shape that corresponds to a right triangle. The annular groove 30 allows for accommodating flowing material of the hollow wheel 10 during rotary friction welding. This ensures that the outer diameter of the gear housing 10 is unchanged after the welding process, compared to the unwelded state.

In all exemplary embodiments according to FIGS. 4 through 7, it can be easily seen—particularly in FIGS. 4 and 6—that the annular surfaces between the proximal region and the distal region of the motor adapter 2, as well as the complementary annular surfaces of the hollow wheel 10, extend over different planes. In other words, the annular surfaces are not arranged in one line, continuously over the entire circumference of the hollow wheel 10 or of the motor adapter 20, but are offset in the axial direction of the hollow wheel 10 in some places. This allows for a rotational alignment of the motor adapter 2 to the hollow wheel 10. At the same time, locking against rotation is thereby achieved.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Gear housing
2 Motor adapter
5 Motor
10 Hollow wheel
11 Joining surface of the hollow wheel
12 Recess on the hollow wheel 13 Internal teething
20 Housing cover
21 Joining surface of the housing cover
22 Recess on the housing cover
30 Annular groove
31 Overlap region
40 Welding bead
51 Electrical contacts
52 Motor shaft

What is claimed is:

1. A gear housing for an epicyclic gear set, the gear housing comprising:
   a hollow wheel having internal teething and a first front end with a first front-side joining surface;
   a housing cover having a second front end with a second front-side joining surface for longitudinally axially covering an entire diameter of the hollow wheel; and
   a bonded connection for connecting the first front end to the second front end through the mating of the first and second front-side joining surfaces, at which the hollow wheel and the housing cover are connected to each other,
   wherein the bonded connection comprises a heated tool weld, an infrared weld, an ultrasonic weld or a rotary friction weld.

2. The gear housing according to claim 1, further comprising:
   a first recess on a first outer circumference defined on the first front end;
   a second recess on a second outer circumference defined on the second front end; and
   a welding bead adjoins the first and second front-side joining surfaces of the hollow wheel and of the housing cover, wherein the first and second recesses together form an annular groove, which accommodates the welding bead.

3. The gear housing according to claim 1, wherein the first and second front-side joining surfaces are aligned orthogonally to an axis of rotation of the hollow wheel.

4. The gear housing according to claim 1, wherein the housing cover is formed by an adapter element that is provided for connection of the gear housing to a motor.

5. The gear housing according to claim 4, wherein the adapter element, on a gear side, is connected or connectable by welding to the hollow wheel and, on a motor side, the adapter element is connectable to various motors.

6. A method for producing a gear housing comprising the following steps performed one after the other:
   providing a hollow wheel with internal teething, at least in sections, and a housing cover, wherein the hollow wheel and the housing cover each have at least one front-side joining surface;
   heating the front-side joining surfaces so that the hollow wheel and the housing cover are melted, in sections, on the front side; and
   coaxially joining the hollow wheel to the housing cover in order to form a bonded connection between the joining surfaces,
   wherein the bonded connection comprises a heated tool weld, an infrared weld, an ultrasonic weld or a rotary friction weld.

7. The method according to claim 6, further comprising the steps of pressing the front-side joining surfaces onto each other by pressure during the coaxial joining until the front-side joining surfaces are cooled and firmly connected by a bonded connection.

8. The method according to claim 7, further comprising the step of heating the joining surfaces for a predetermined duration, wherein the duration is preselected according to the type and efficiency of a radiation element used to heat the joining surfaces.

9. The method according to claim 6, further comprising the step of heating the joining surfaces to above the respective melting point of a synthetic material used for forming (i) the hollow wheel, (ii) the housing cover or (iii) both the hollow wheel and the housing cover.

10. The method according to claim 6, wherein the hollow wheel and the housing cover are inserted into a joining device, and
    wherein a joining force is applied to the hollow wheel and the housing cover by (i) two pneumatic cylinders, (ii) a servomotor axis, or (iii) both the two pneumatic cylinders and the servomotor axis, and
    wherein the joining force is preset as a function of the size of the front-side joining surfaces.

11. The method according to claim 6, wherein after joining, the hollow wheel and the housing cover are cooled for a predetermined duration while maintaining a joining force, wherein the predetermined duration depends upon the material used and on the size.

12. The gear housing according to claim 6, wherein the front-side joining surfaces are heated by a heated tool.

13. The gear housing according to claim 6, wherein the front-side joining surfaces are heated by an infrared radiator.

14. A gear housing for an epicyclic gear set, the gear set comprising:
    a hollow wheel, which has internal teething, at least in sections, and a first front end with a first front-side joining surface; and
    a housing cover having a second front end with a second front-side joining surface for longitudinally axially covering the hollow wheel, wherein the hollow wheel and the housing cover mesh coaxially so that an annular overlap region is formed, in which the first front-side joining surface of the hollow wheel and the second front-side joining surface of the housing cover touch each other, and the hollow wheel and the housing cover respectively have conical joining surfaces in the overlap region and, along the front-side joining surfaces so that the first and second front-side joining surfaces are connected to each other by a bonded connection by rotary friction welding.

15. A method for producing a gear housing, the method comprising the steps of carried out in order:
    providing a hollow wheel with internal teething, at least in sections, and a housing cover, wherein the hollow wheel and the housing cover each have conical joining surfaces that are complementary to each other;
    coaxially joining the hollow wheel to the housing cover in order to establish a surface contact between the conical joining surfaces, wherein an overlap region is formed; and
    heating the overlap region so that the hollow wheel and the housing cover are connected by a bonded connection in the overlap region.

16. The method according to claim 15, further comprising the step of creating a press-fit connection between the joining surfaces of the hollow wheel and the housing cover when the surface contact is established.

* * * * *